United States Patent [19]

Kawamura

[11] Patent Number: 4,745,755
[45] Date of Patent: May 24, 1988

[54] CONTROL SYSTEM FOR SUPERCHARGED INTERNAL COMBUSTION ENGINE

[75] Inventor: Hideo Kawamura, Samukawa, Japan

[73] Assignee: Isuzu Motors Limited, Tokyo, Japan

[21] Appl. No.: 888,406

[22] Filed: Jul. 23, 1986

[30] Foreign Application Priority Data

Jul. 26, 1985 [JP] Japan ................................ 60-165340
Jul. 26, 1985 [JP] Japan ................................ 60-165341

[51] Int. Cl.$^4$ ............................................ F02B 37/14
[52] U.S. Cl. ........................................ 60/608; 290/52
[58] Field of Search ................ 60/597, 598, 607, 608; 290/52

[56] References Cited

U.S. PATENT DOCUMENTS 3,961,199  6/1976  Bronicki ........................... 60/607 X
4,485,310  11/1984 Valroger ........................... 60/607 X

FOREIGN PATENT DOCUMENTS 79100    5/1983  European Pat. Off. ............. 60/608
141634   5/1985  European Pat. Off. ............. 60/597
214615   12/1983 Japan ............................... 60/597
18231    1/1984  Japan ............................... 60/597
101540   6/1984  Japan ............................... 60/608
212622   10/1985 Japan ............................... 60/608

Primary Examiner—Michael Koczo
Attorney, Agent, or Firm—Staas & Halsey

[57] ABSTRACT

A supercharger associated with an internal combustion engine has a rotatable shaft on which there is mounted an electric rotary machine operable as an electric motor or an electric generator. When the motor vehicle driven by the internal combustion engine is braked so as to be decelerated, the rotary machine is operated as the generator to enable the supercharger turbine to act virtually as a load on the exhaust manifold of the engine, thereby increasing the force of an engine brake. When the motor vehicle is to be further decelerated, the rotary machine is operated as the motor to reverse rotation of the turbine impeller for further increasing the load on the exhaust manifold to add to the engine brake force. While the rotary machine is being operated as the generator, electric power generated thereby is used to charge a battery. When the rotary machine is operated as the motor, the stored electric power is supplied from the battery to the rotary machine.

7 Claims, 3 Drawing Sheets

CONTROL SYSTEM FOR SUPERCHARGED INTERNAL COMBUSTION ENGINE

BACKGROUND OF THE INVENTION

The present invention relates to a control system for a supercharged internal combustion engine, and more particularly to a control system for controlling an internal combustion engine having a supercharger associated with a rotary electric machine.

Internal combustion engines on some recent motor vehicles are equipped with a supercharger comprising a turbine driven by the energy of an exhaust gas emitted from the engine and a compressor coupled to the turbine for charging air into the engine cylinders to burn the fuel efficiently.

There has been proposed a rotary electric machine connected to the turbine shaft of such a supercharger, the rotary electric machine being operable as either an electric motor or an electric generator depending on the operating condition of the engine (see Japanese Patent Application No. 58(1983)-51559).

One widely used type of motor vehicle brake is known as an exhaust brake which brakes the vehicle with increased engine braking by closing the exhaust pipe of a diesel engine, for example.

As shown in FIG. 4 of the accompanying drawings, when a supercharged internal combustion engine is operated in medium and high speed ranges, the turbine of the supercharger rotates at a high speed to increase the pressure of the supercharged air since the exhaust energy emitted from the engine is large. Therefore, a torque curve Tb plotted in the medium and high engine speeds is higher than a torque curve Ta plotted when the engine is not supercharged. While the engine is being operated in a low speed range, no sufficient boost pressure is generated even if the supercharger is driven since the exhaust energy is small. Consequently, the engine torque is generally low when the engine speed is low.

In order to increase the engine torque at low engine speeds, it has been practiced to reduce the opening of the nozzle which supplies the exhaust gas to the turbine, thereby increasing the pressure on the turbine. However, the device for varying the nozzle opening is costly, and it is difficult to achieve a desired level of durability of the turbine which is subject to high-temperature exhaust gases.

The exhaust brake arrangement as referred to above requires a valve of a high sealing capability to be installed for closing the exhaust pipe, and is also disadvantageous since there is a limitation on the range of materials available for the valve that is held in contact with the high-temperature exhaust gas, and the shaft for opening and closing the valve must be lubricated.

Another problem of the exhaust brake system is that the exhaust energy is not effectively utilized since it only increases the engine braking action by simply closing the exhaust pipe to raise the back pressure.

SUMMARY OF THE INVENTION

In view of the aforesaid drawbacks of the conventional arrangements, it is an object of the present invention to provide a control system for a supercharger of an internal combustion engine, the supercharger including a rotary electric machine coupled to the rotatable shaft of the supercharger, the rotary electric machine being operated as an electric generator in response to a signal from engine brake mode setting means of the internal combustion engine to thereby increase a load, the exhaust turbine of the supercharger to increase back pressure in the engine so that an engine brake is effectively applied without the need for an exhaust brake valve, and further, a strong engine braking force being achieved by operating the rotary electric machine as an electric motor to reverse the rotation of the exhaust turbine of the supercharger to increase the back pressure of the internal combustion engine.

Another object of the present invention is to provide a control system for a supercharger, which includes an electric motor/generator that is operated as a generator by effective utilization of exhaust energy to convert it to electric energy, which is used to charge a battery, thus dispensing with a generator which would otherwise be required for charging the battery.

Still anothr object of the present invention is to provide a control system for a supercharger, which includes an electric motor/generator that is operated as a motor when an engine is operated at a low speed to produce a low engine output, for thereby assisting in the supercharging operation of the supercharger to produce a larger engine torque for an increased engine output even if the engine speed is low.

According to the present invention, there is provided a control system for an internal combustion engine including a supercharger operated by exhaust gas having a rotary electric machine coupled to the rotatable shaft of the supercharger and imposing a load on the exhaust turbine of the supercharger, means for setting of an engine brake mode of the internal combustion engine and means for operating the rotary electric machine when the exhaust brake mode is set.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 2:
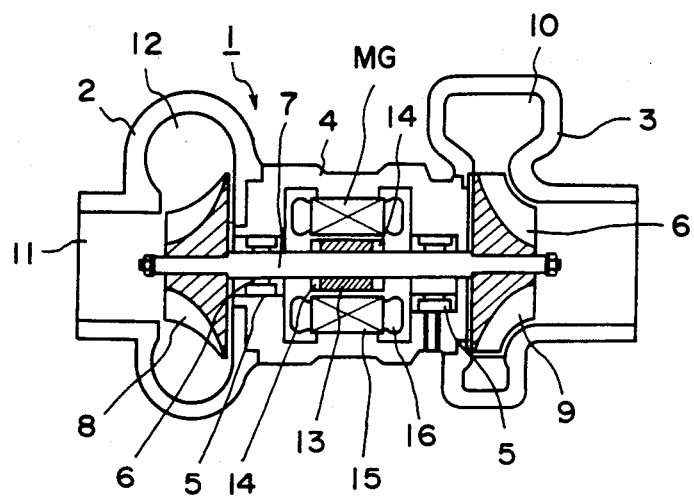
FIG. 2 is a cross-sectional view of a supercharger incorporated in the control system shown in FIG. 1.

As shown in FIG. 2, a supercharger 1 includes a compressor housing 2, a turbine housing 3, and a central housing 4. Fixed bearings 5 are disposed at opposite ends of the central housing 4, and floating bearings 6 are slidably rotatably disposed in the fixed bearings 5, respectively. A shaft 7 extends through the floating bearings 6 and has its opposite end portions rotatably supported by the floating bearings 6.

To the opposite ends of the shaft 7, there are secured a compressor impeller 8 and a turbine impeller 9, respectively, which are accommodated respectively in the compressor and turbine housings 2, 3. The turbine impeller 9 is rotated by the energy of an exhaust gas delivered from an internal combustion engine 20 (FIG.

1) into a scroll 10. When the turbine impeller 9 is rotated, it rotates the shaft 7 to rotate the compressor impeller 8 for pressurizing air introduced from an air intake pipe 11 in a diffuser 12 and charging air under pressure into the cylinders of the internal combustion engine 20.

An axially elongate ring-shaped magnet rotor 13 made of a material containing a rare earth element is mounted substantially centrally on the shaft 7 for generating strong magnetic forces. The opposite end faces of the magnet rotor 3 are securely held by metal disks 14 of high tensile strength. The magnet rotor 13 is also reinforced with carbon fibers wound around the outer circumference thereof. Therefore, the magnet rotor 13 is highly strong and durable against centrifugal forces and vibration upon rotation at high speeds.

A stator core 15 is mounted in the central housing 4 in surrounding relation to the magnet motor 13. A stator coil 16 is wound on the stator core 15 for inducing an AC voltage in response to rotation of the magnet rotor 13. The magnet rotor 13, the stator core 15, and the stator coil 16 jointly constitute an AC machine serving as an electric motor/generator MG.

Figure 1:
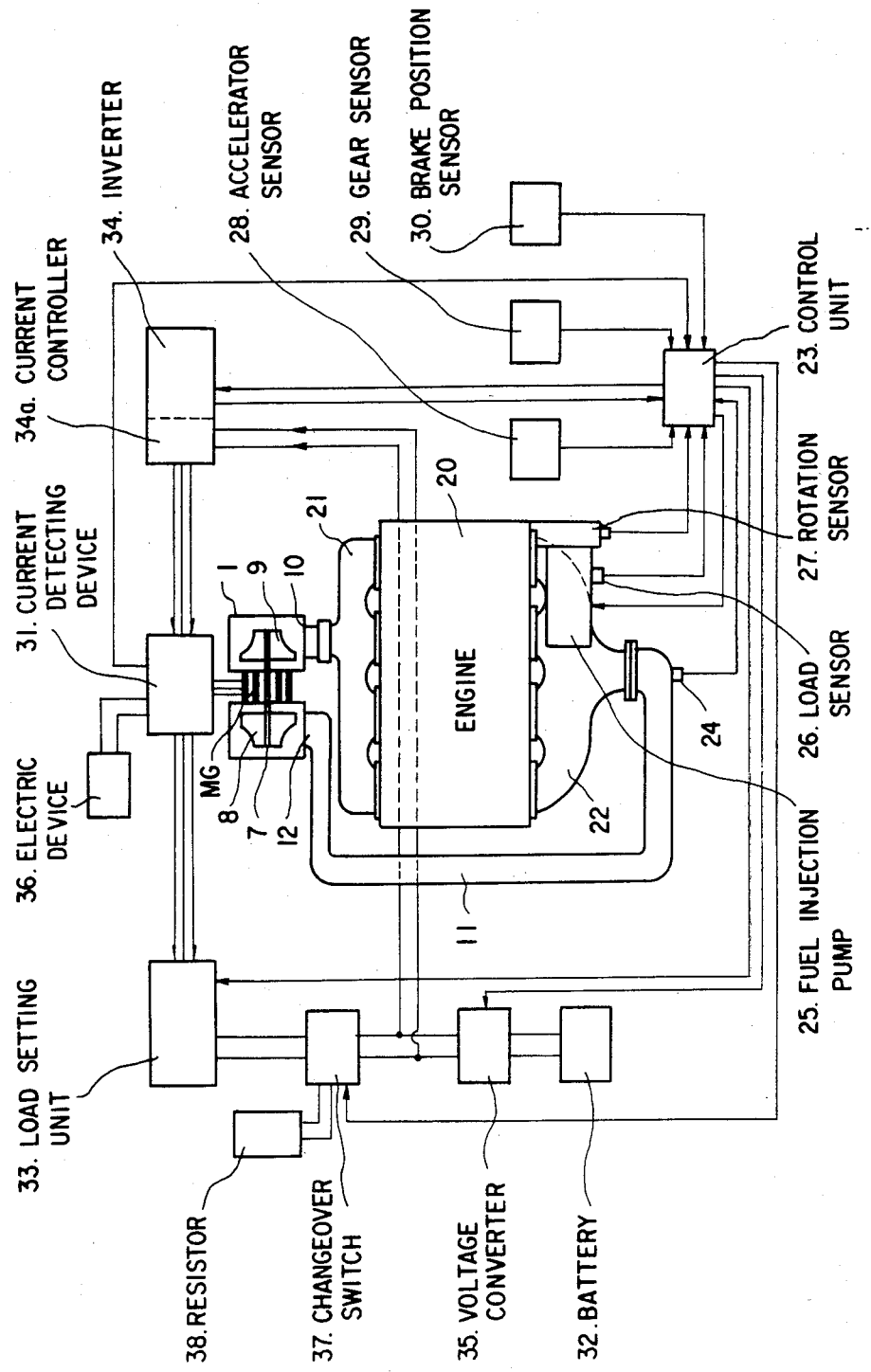
FIG. 1 is a view, partly in block form, of a control system according to the present invention.

As illustrated in FIG. 1, an exhaust manifold 21 is connected to the exhaust ports of the internal combustion engine 20 and communicates with the scroll 10 of the supercharger 1. The diffuser 12 is held in communication through the air intake pipe 11 with an intake manifold 22, to which there is attached a boost sensor 24 for detecting the boost pressure and applying a boost signal to a control unit 23. A fuel injection pump 25 is mounted on the internal combustion engine 20 for injecting fuel into the engine cylinders. A load sensor 26 is associated with the fuel injection pump 25 for detecting the amount of fuel injected thereby to detect the load imposed on the internal combustion engine 20. A load signal from the load sensor 26 is fed to the control unit 23. The amount of fuel injected by the fuel injection pump 25 into the cylinders of the internal combustion engine 20 is controlled by a control signal produced by the control unit 23.

A rotation sensor 27 is also associated with the internal combustion engine 20 for detecting the speed of rotation of the crankshaft of the engine 20. A detected rotation signal is fed from the rotation sensor 27 to the control unit 23.

The control unit 23 is also supplied with a signal from an accelerator sensor 28 which detects the depth to which the accelerator pedal is depressed, a signal from a gear sensor 29 which detects the position of a select lever that selects a gear of a gear transmission, and a signal from a brake position sensor 30. The signal from sensor 30 is used to set an engine brake mode in which the engine is used to brake or reduce the speed of the load driven by the motor. The brake position sensor 30 has, for example, three positions corresponding to large (I), medium (II) and small (III) braking forces which may be selected by the operator of the motor vehicle to determine the magnitude of the effec of the engine brake.

The stator coil 16 of the motor/generator MG is connected to a current detecting device 31. When the motor/generator MG operates as a generator, the current detecting device 31 detects an output current from the generator. When the motor/generator MG operates as a motor, the current detecting device 31 detects a current supplied from a battery 32, and can detect the electric energy stored in the battery 32 by calculating the current supplied from the battery 32 and a current consumed to charge the battery 32. Signals indicative of the electric energy stored in the battery 32 and the detected currents are applied from the current detecting device 31 to the control unit 23. A load setting unit 33 serves to establish an electric power output when the motor/generator MG is to operate as the generator, and is controlled by a command signal from the control unit 23 for setting such an electric power output. An inverter 34 converts a direct current supplied from the battery via a voltage converter 35 to an alternating current and supplies the alternating current to the motor/generator MG, the inverter 34 having a current controller 34a controlled by the control unit 23. Designated at 36 is another electric device installed on the motor vehicle on which the engine 20 is mounted, 38 a resistor, and 37 a changeover switch for supplying a current via the load setting unit 33 to the resistor 38.

Figure 3:
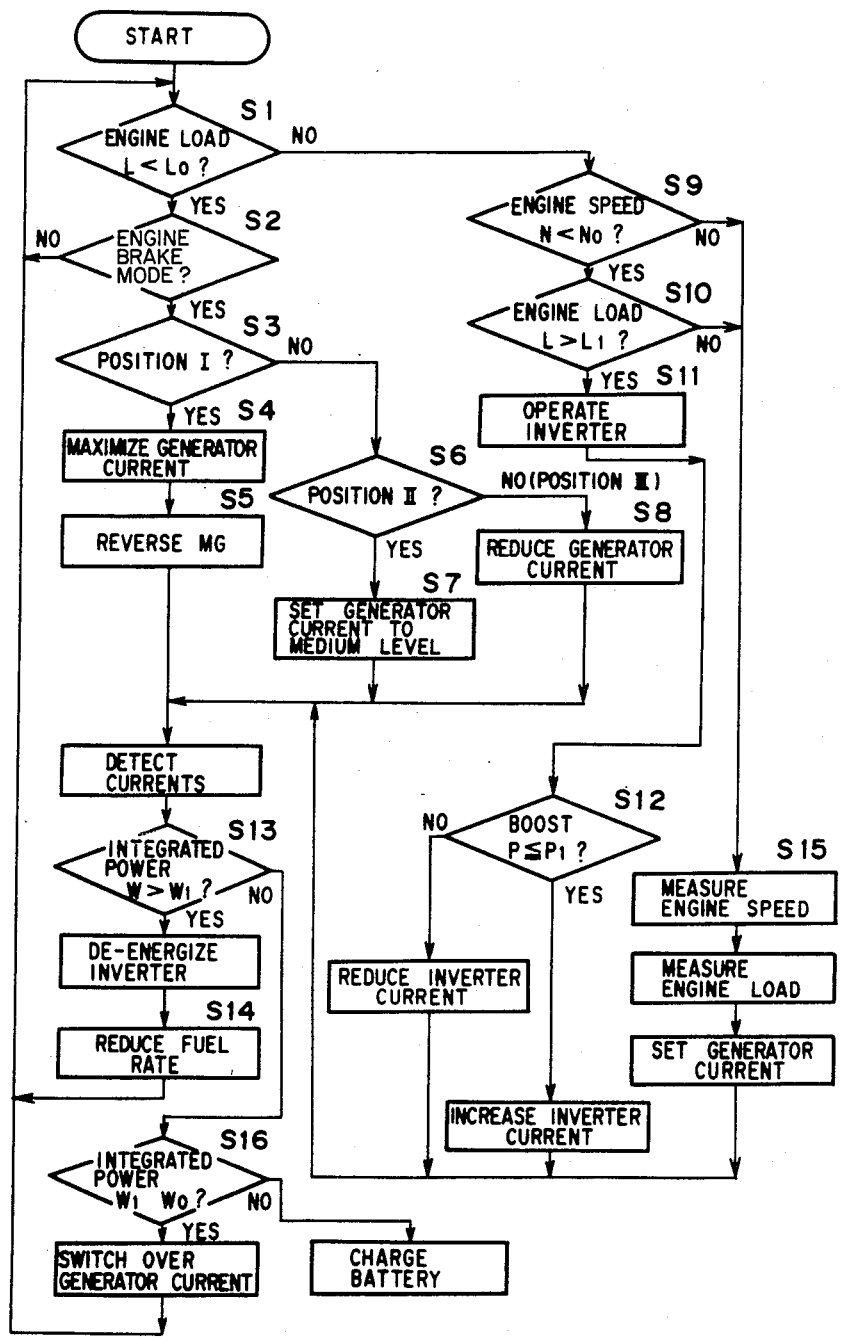
FIG. 3 is a flowchart of an operation sequence of the control system.

Operation of the control system shown in FIGS. 1 and 2 will be described with reference to the flowchart of FIG. 3. While the motor vehicle is running, the control unit 23 determines in step S1 whether an engine load L is less than a prescribed load L0 based on a signal from the load sensor 26 on the fuel pump 25. If it is determined that the engine load L is less than the prescribed load L0, signals from the gear sensor 29 and the accelerator sensor 28 are checked. If it is determined that the gear position is suitable for the operation of the engine brake and the accelerator pedal is not depressed, then control passes to Step S2. The signal from the brake position sensor 30 is checked in step S2. If the brake position indicates that the engine brake mode is selected, then the brake position is compared in step S3 with a position I requiring a maximum exhaust brake force. If the signal from sensor 30 indicates that position I has been selected, then the motor/generator MG is operated as a generator and the load setting unit 33 is controlled to maximize the generator current and the battery 32 is charged with a large current in a step S4. To produce a greater engine brake effect, electric power may be supplied in step S5 from the inverter 34 to the motor/generator MG so that the motor/generator MG will be rotated as a motor to reverse the direction of rotation of the shaft 7 of the supercharger 1 causing the rotation of the turbine impeller 9 to be reversed, thereby increasing the back pressure of the internal combustion engine 5.

If the signal from the brake position sensor 30 is indicative of a position II in step S3, then control goes to step S6 and then step S7 in which the generator current is controlled at a medium level to exert the engine brake at a medium level. If the brake position is a postion III in step S6, then the load setting unit 33 is controlled so that the generator current is reduced to weaken the brake force at step S8.

If the signal from the load sensor 26 indicates that the engine load L is larger than the prescribed load L0 in step S1, the signal from the rotation sensor 27 indicates that the engine speed N is lower than a prescribed speed N0 in step S9, and the engine load L is larger than a high load L1 in step S10, i.e., if the engine rotates at a low speed and is required to produce a large output, then the inverter 34 is operated in step S11 to convert a direct current from the battery 32 to an alternating current for thereby operating the motor/generator MG as a motor. The rotation of the compressor impeller 8 is now assisted by the motor to charge air under pressure into the intake manifold 22. If the signal from the boost sensor 24 on the intake manifold 22 indicates that the boost pressure P is lower than a prescribed boost pressure P1 in a step S12, then the current supplied from the inverter 34 to the motor/generator MG is increased. If the boost pressure P is higher than the prescribed boost pressure P1, the supplied current is reduced. The output power from the internal combustion engine 20 when it rotates at a low speed is therefore controlled so as to be increased.

As described above, when the engine brake is required, the motor/generator MG is operated as a generator to charge the battery 32. When the internal combustion engine 20 is required to increase its output power in a low speed range, the motor/generator MG is operated as a motor and the current is supplied from the battery 32. The current detecting device 31 detects these charging and supplied currents and integrates them. The integrated electric power W1 stored in the battery 32 and the integrated electric power W supplied to energize the motor are compared. If the power W is larger than the power W1 in step S13, then it is determined that the battery 32 is excessively discharged, and hence the current supply to the inverter 34 is cut off. Thereafter, the rate of flow of fuel injected by the fuel injection pump 25 is reduced in step S14 to prevent an exhaust gas smoke which would otherwise be produced by excessive fuel supply.

If the integrated power W1 is greater than the integrated power W in step S13, then control jumps to step S16 which ascertains whether the integrated power W1 is larger than a storage capacity W0 of the battery 32. If the power W1 is larger than the storage capacity W0, then it is determined that the battery 32 is excessively charged and likely to be damaged. Therefore, the changeover switch 37 is shifted to the side of the resistor 38 to deliver the load current from the load setting unit 33 to the resistor 38.

If the engine speed N is higher than the prescribed speed N0 in step S9 and/or if the engine load L is lower than the large load L1, then control goes to step S15 in which the engine speed and load are measured, and the load setting unit 33 is controlled to produce a generator output commensurate with the measured engine speed and load for charging the battery 32. Since the current which charges the battery 32 and a current supplied to the other electric device 36 pass through the current detecting device 31, they are also integrated thereby in the integrating process as described above.

With the arrangement of the present invention, as described above, the motor/generator MG is mounted on the rotatable shaft 7 of the supercharger 1 and is controlled by a signal from brake mode setting means based upon signals indicative of the engine load, the engine speed, and the magnitude of the brake. This enables the engine brake to be operated with increased effect without the need for an exhaust brake valve. Further, the engine braking effect can be increased by reversing the rotation of the turbine impeller 9.

No conventional battery charging generator is required since the exhaust energy is converted to electric energy by the motor/generator MG for charging the battery 32.

Figure 4:
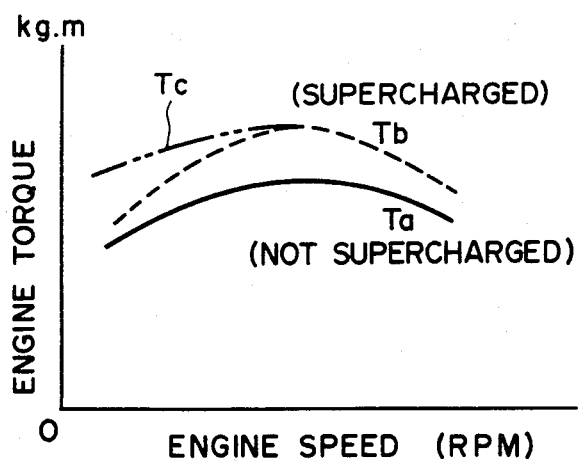
FIG. 4 is a graph showing the relationship between engine speed and engine torque.

When the engine 20 rotates at a low speed and produces a low output, the motor/generator MG is operated as a motor to assist the supercharger 1 in charging air into the engine 20 cylinders. Therefore, the engine can produce a large torque even when it operates in the low-speed range. As indicated by the torque curve Tc in FIG. 4, the engine torque during low-speed operation of the engine 20 is increased for a greater engine output.

Although a certain preferred embodiment has been shown and described, it should be understood that many changes and modifications may be made therein without departing from the scope of the appended claims.

What I claim is:

1. A control system for controlling an internal combustion engine having a supercharger including a rotatable shaft and an exhaust turbine driven by exhaust gas, said control system comprising:
   a rotary electric machine mounted on the rotatable shaft of the supercharger for imposing a load on the exhaust turbine of the supercharger;
   setting means for setting an engine brake mode of the internal combustion engine; and
   operating means for operating said rotary electric machine when the engine brake mode is set by said setting means.

2. A control system according to claim 1, wherein said rotary electric machine imposes the load on the exhaust turbine of the supercharger by operating as an electric generator.

3. A control system according to claim 1, wherein said rotary electric machine imposes the load on the exhaust turbine of the supercharger by operating as an electric motor reversing the rotation of the exhaust turbine.

4. A control system for controlling an internal combustion engine having a supercharger with a rotatable shaft driven by exhaust gas, said control system comprising:
   a rotary electric machine mounted on the rotatable shaft of said supercharger and operable selectively as one of an electric generator and an electric motor;
   setting means for setting an engine brake mode of the internal combustion engine;
   operating means for operating said rotary electric machine as the electric generator when the engine brake mode is set by said setting means; and
   consuming means for consuming electric power generated by said rotary electric machine as a load of the electric generator.

5. A control system according to claim 4, wherein said consuming means comprises means for charging a battery with electric power generated by the electric generator.

6. A control system for controlling an internal combustion engine having a supercharger with a rotatable shaft and an exhaust turbine driven by exhaust gas, said control system comprising:
   a rotary electric machine mounted on the rotatable shaft of the supercharger and operable selectively as one of an electric generator and an electric motor;
   an inverter for driving said rotatary electric machine as an electric motor;
   setting means for setting the magnitude of a force of an engine brake to be imposed on the internal combustion engine;
   inverter driving means for driving said inverter to operate said rotary electric machine as the electric motor when the force of the engine brake is set at a value larger than a prescribed value by said engine brake mode setting means, for reversing rotation of the exhaust turbine of the supercharger;

operating means for operating said rotary electric machine as the electric generator when the force of the engine brake is set at a value smaller than the prescribed value; and consuming means for consuming electric power generated by said electric generator as a load of the electric generator.

7. A control system according to claim 6, wherein said consuming means comprises means for charging a battery with electric power generated by the electric generator.

* * * * *